US011483973B1

(12) United States Patent
Pernice

(10) Patent No.: US 11,483,973 B1
(45) Date of Patent: Nov. 1, 2022

(54) MULCH DIVERTING APPARATUS FOR A LAWNMOWER

(71) Applicant: Craig Pernice, North Bellmore, NY (US)

(72) Inventor: Craig Pernice, North Bellmore, NY (US)

( * ) Notice: Subject to any disclaimer, the term of this patent is extended or adjusted under 35 U.S.C. 154(b) by 0 days.

(21) Appl. No.: 17/665,099

(22) Filed: Feb. 4, 2022

(51) Int. Cl.
 *A01D 34/00* (2006.01)
 *A01D 34/71* (2006.01)
 *A01D 42/00* (2006.01)
 *A01D 101/00* (2006.01)

(52) U.S. Cl.
 CPC ......... *A01D 42/005* (2013.01); *A01D 34/005* (2013.01); *A01D 34/71* (2013.01); *A01D 2101/00* (2013.01)

(58) Field of Classification Search
 CPC ...... A01D 42/08; A01D 43/08; A01D 34/005; A01D 34/71
 See application file for complete search history.

(56) References Cited

U.S. PATENT DOCUMENTS

| 5,465,564 | A  | * | 11/1995 | Koehn    | A01D 34/005 56/13.6 |
| 7,093,415 | B2 | * | 8/2006  | Kallevig | A01D 34/005 56/6 |
| 7,448,195 | B2 | * | 11/2008 | Kohler   | A01D 34/82 56/320.2 |
| 7,526,909 | B1 | * | 5/2009  | Procter  | A01D 42/005 56/320.2 |
| 7,603,838 | B1 | * | 10/2009 | Henley, Jr. | A01D 43/16 56/13.7 |
| 7,726,110 | B2 | * | 6/2010  | Nicholson | A01D 75/185 56/320.2 |
| 8,850,782 | B2 |   | 10/2014 | Haraqia et al. | |
| 9,192,100 | B1 | * | 11/2015 | Ullom    | A01D 34/82 |
| 10,638,662 | B2 | * | 5/2020  | Spitz   | A01D 42/005 |
| 10,791,672 | B2 | * | 10/2020 | Berglund | A01D 34/71 |
| 10,897,845 | B2 | * | 1/2021  | Walker   | A01D 34/71 |
| 2004/0128970 | A1 | * | 7/2004 | Gazlay   | A01D 34/71 56/320.2 |
| 2021/0068342 | A1 | * | 3/2021  | Foster   | A01D 34/824 |
| 2021/0315156 | A1 | * | 10/2021 | Richards | A01D 34/64 |

* cited by examiner

*Primary Examiner* — Alicia Torres
(74) *Attorney, Agent, or Firm* — KOS IP Law LLP

(57) ABSTRACT

A mulch diverting apparatus includes a panel configured to be coupled with a lawnmower. The panel includes a body portion defining a first side, a second side, an upper side, and a lateral surface configured to face the lawnmower. A first projection extends from the lateral surface of the body portion. The first projection extends toward the first side of the panel. A second projection extends from the lateral surface of the body portion. The second projection extends toward the second side of the body portion. A third projection extends from the lateral surface of the body portion. The third projection defines an orifice. A fourth projection extends from the lateral surface of the body portion. The fourth projection includes an arm extending from the body portion.

20 Claims, 6 Drawing Sheets

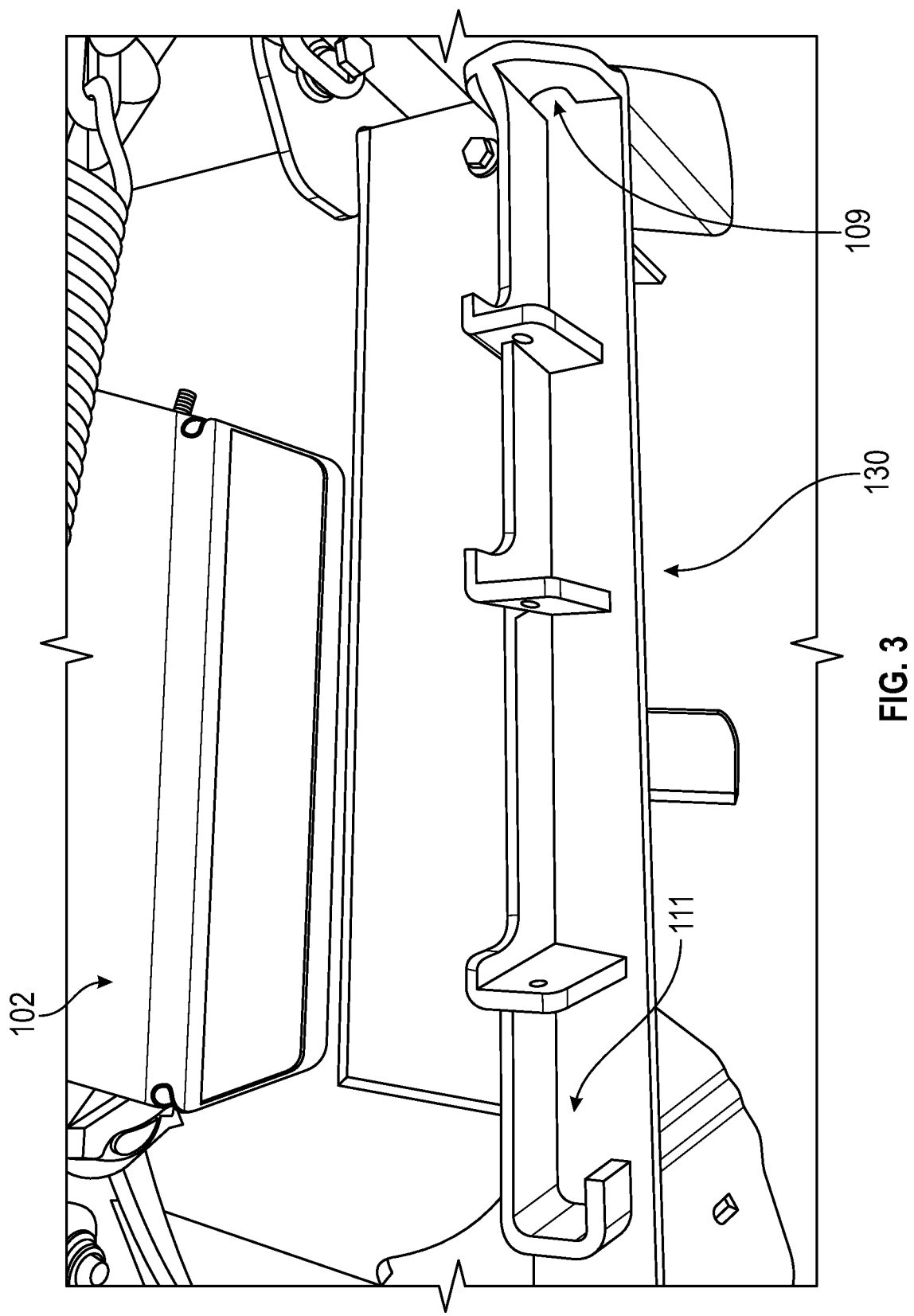

MULCH DIVERTING APPARATUS FOR A LAWNMOWER

FIELD

The present disclosure relates to a mulch diverting apparatus, and more particularly, to a mulch diverting apparatus for a lawnmower.

BACKGROUND

A lawnmower (also referred to as a mower, grass cutter or lawn mower) is a machine including a number of revolving blades used to cut a grass to a desired height. The height of the cut grass may be determined by the design of the mower, but the height may be adjustable by the operator, such as by a lever or nut and bolt on the lawnmower's wheels. The blades may be powered by a manual force, with one or more wheels mechanically coupled with the cutting blades such that when the mower is pushed forward, the blades spin to cut grass. A lawnmower may include a battery-powered or plug-in electric motor.

Generally, the cut grass generated by the lawnmower is collected in a grass collecting bin and discarded. In a commercial setting in which large volumes of grass is cut, the disposal of the cut grass can create a considerable operating expense.

However, grass clippings from a lawnmower can be collected and used elsewhere as mulch. Reasons for applying mulch may include conserving soil moisture, improving fertility and health of the soil, reducing weed growth and increasing the visual appeal of an area.

SUMMARY

Provided in accordance with aspects of the present disclosure is a mulch diverting apparatus including a panel configured to be coupled with a lawnmower. The panel includes a body portion defining a first side, a second side, an upper side, and a lateral surface configured to face the lawnmower. The body portion of the panel includes a first projection extending from the lateral surface of the body portion. The first projection extends toward the first side of the panel. The first projection mates with a first orifice formed in the lawnmower to couple the body portion of the panel with the lawnmower. A second projection extends from the lateral surface of the body portion. The second projection extends toward the second side of the panel. The second projection mates with a channel formed in the lawnmower to couple the body portion with the lawnmower. A third projection extends from the lateral surface of the body portion. The third projection defines an orifice configured to receive a first projection of a grass collecting bin to couple the grass collecting bin with the lawnmower. A fourth projection extends from the lateral surface of the body portion. The fourth projection includes a first arm configured to prevent lateral movement of the grass collecting bin with respect to the lawnmower.

In an aspect of the present disclosure, the panel is configured to be removably coupled with the lawnmower.

In an aspect of the present disclosure, the lawnmower is a commercial lawnmower.

In an aspect of the present disclosure, the third projection and the fourth projection are configured to removably couple the grass collecting bin with the lawnmower.

In an aspect of the present disclosure, the first projection of the body portion of the panel defines a cylindrical shape.

In an aspect of the present disclosure, the second projection of the body portion of the panel defines a cuboidal shape.

In an aspect of the present disclosure, the orifice defined by the third projection defines a circular cross-sectional profile. The first projection of the grass collecting bin defines a cylindrical shape.

In an aspect of the present disclosure, the first arm of the fourth projection extends above the upper side of the body portion.

In an aspect of the present disclosure, the fourth projection includes a second arm extending from the lateral surface of the body portion. The second arm supports a second projection of the grass collecting bin to prevent downward movement of the grass collecting bin with respect to the lawnmower.

In an aspect of the present disclosure, the lateral surface of the body portion of the panel is a flat surface configured to face the lawnmower.

In an aspect of the present disclosure, the lateral surface of the body portion includes a curved lateral surface. The curved lateral surface is configured to face a curved portion of the lawnmower.

In an aspect of the present disclosure, a handle extends from the body portion.

In an aspect of the present disclosure, the handle extends from the upper side of the body portion.

BRIEF DESCRIPTION OF THE DRAWINGS

Various aspects and features of the present disclosure are described hereinbelow with reference to the drawings wherein:

FIG. 3 is a top-down view of the lawnmower of FIG. 3 with the mulch diverting apparatus of FIG. 1 removed;

DETAILED DESCRIPTION

Figure 1A:
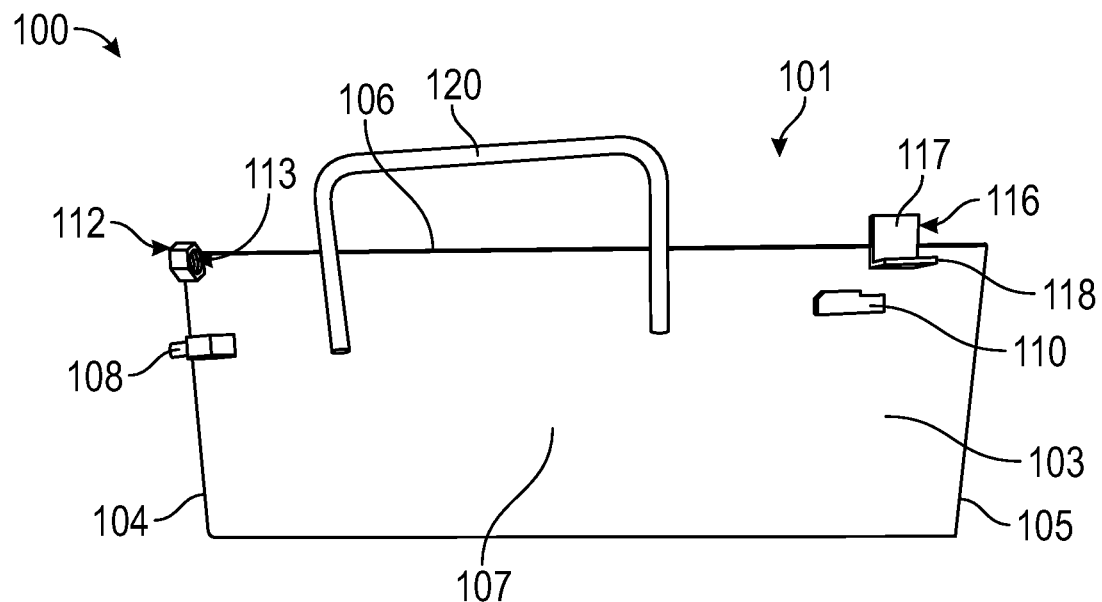
FIG. 1A is a side view of a mulch diverting apparatus according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The term projection may refer to a pin or a pin-like structure configured to support a structure to which the projection extends. The projections described herein may define a cylindrical or cuboidal shape depending on the corresponding structure (e.g., orifice or channel) to which it is intended to mate or be coupled with. Each projection described herein may define at least one extending arm forming an angle (e.g., a 90 degree angle) with respect to the lateral surface described herein. As an example, a projection may be engaged in an orifice or a channel of an adjacent structure and the orifice or channel may mate with and/or be coupled with (e.g., removably coupled with) the projection. The orifices described herein may define spherical or cylindrical shapes configured to receive a corresponding projection defining a cylindrical shape.

Referring to FIGS. 1-5, a mulch diverting apparatus 100 includes a panel 101 configured to be coupled with a lawnmower 102. The panel 101 includes a body portion 103 defining a first side 104, a second side 105, an upper side 106, and a lateral surface 107 configured to face the lawnmower 102.

The body portion 103 of the panel 101 includes a first projection 108 extending from the lateral surface 107 of the body portion 103. The first projection 108 extends toward the first side 104 of the panel 101. As an example, the first projection 108 may overlap or extend beyond the first side 104 of the panel 101. The first projection 108 mates with a first orifice 109 formed in the lawnmower to couple the body portion 103 of the panel 101 with the lawnmower 102.

A second projection 110 extends from the lateral surface 107 of the body portion 103. The second projection 110 extends toward the second side 105 of the panel 101. The second projection 110 mates with a channel 111 formed in the lawnmower 102 to couple the body portion 103 with the lawnmower 102.

A third projection 112 extends from the lateral surface 107 of the body portion 103. The third projection 112 defines an orifice 113 configured to receive a first projection 114 of a grass collecting bin 115 to couple the grass collecting bin 115 with the lawnmower 102.

A fourth projection 116 extends from the lateral surface 107 of the body portion 103. The fourth projection 116 includes a first arm 117 configured to prevent lateral movement of the grass collecting bin with respect to the lawnmower 102.

In an aspect of the present disclosure, the first arm 117 of the fourth projection 116 extends above the upper side of the body portion 103.

In an aspect of the present disclosure, the fourth projection 116 includes a second arm 118 extending from the lateral surface 107 of the body portion 103. The second arm 118 supports a second projection 119 of the grass collecting bin 115 to prevent downward movement of the grass collecting bin 115 with respect to the lawnmower 102. Thus, the fourth projection 116 is configured to support the second projection 119 of the grass collecting bin 115 to prevent to prevent both downward and lateral movement of the grass collecting bin 115 with respect to the lawnmower 102.

In an aspect of the present disclosure, the panel 101 is configured to be removably coupled with the lawnmower 102. The lawnmower 102 may be a commercial lawnmower. For example, the third projection 112 and the fourth projection 116 are configured to removably couple the grass collecting bin 115 with the lawnmower 102 by removably coupling the grass collecting bin 115 with the panel 101 that is removably coupled with the lawnmower 102.

Figure 1B:
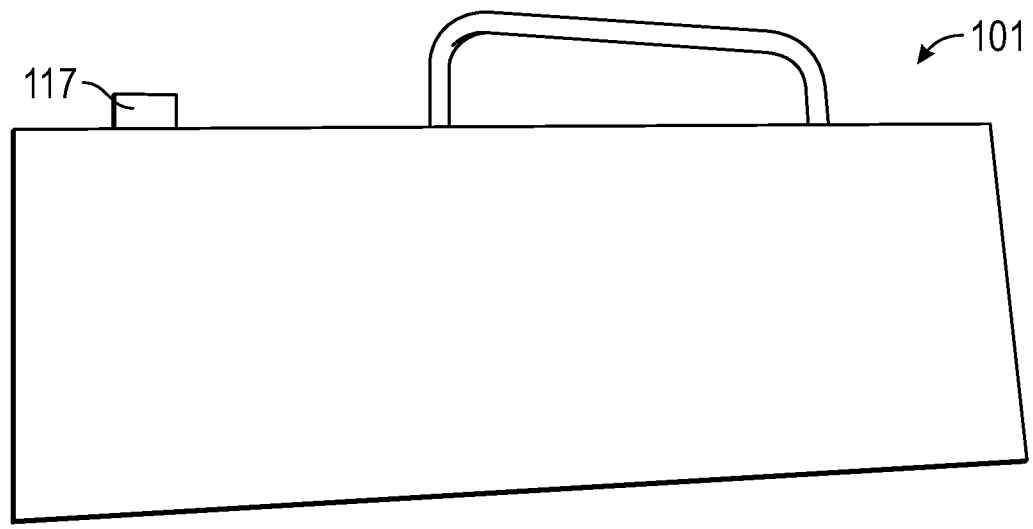
FIG. 1B is an opposite side view of the mulch diverting apparatus of FIG. 1A.
Figure 2:
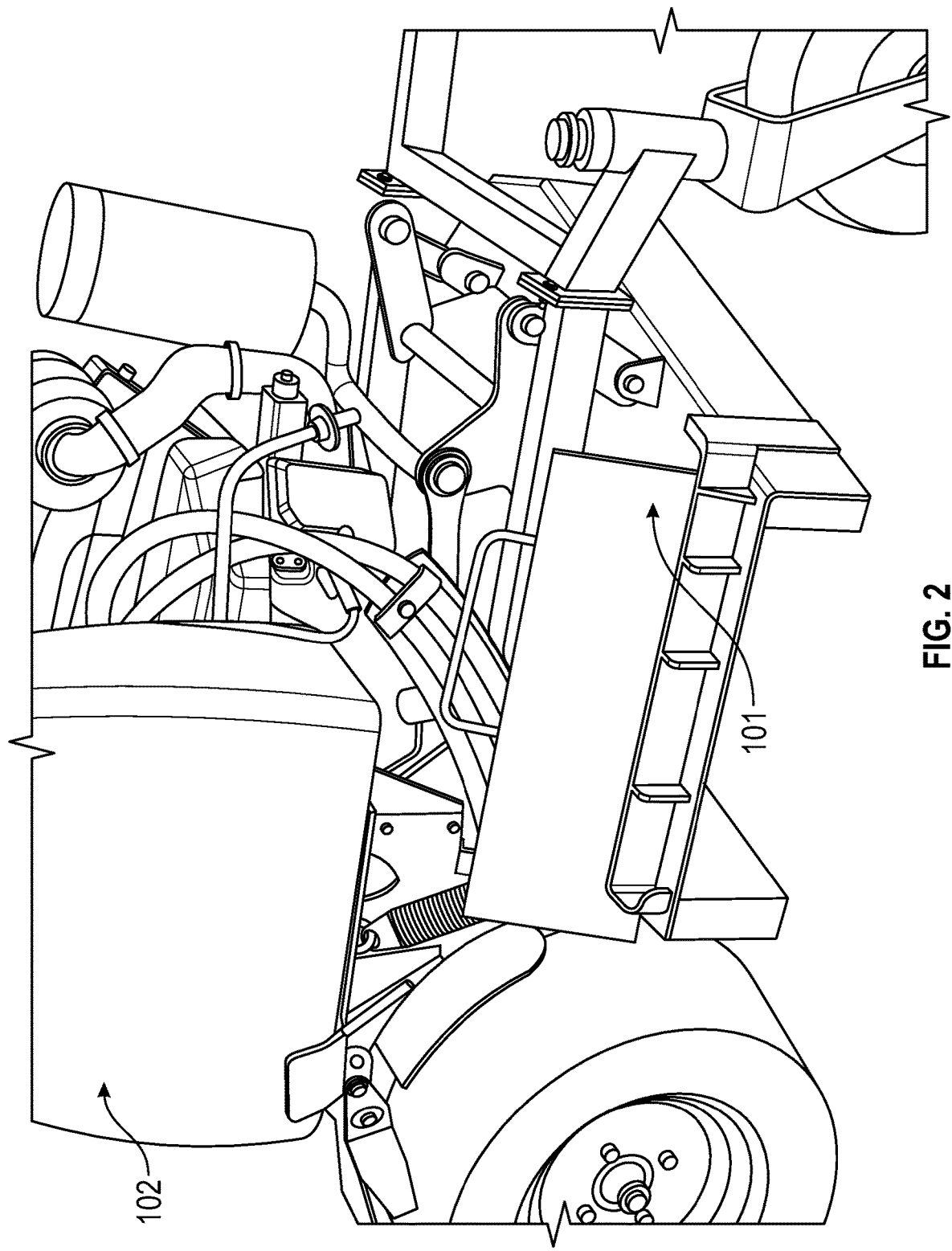
FIG. 2 is a perspective view of a lawnmower displaying an uncovered grass outlet and the mulch diverting apparatus of FIG. 1 removed from the lawnmower and positioned above the grass outlet.
Figure 4A:
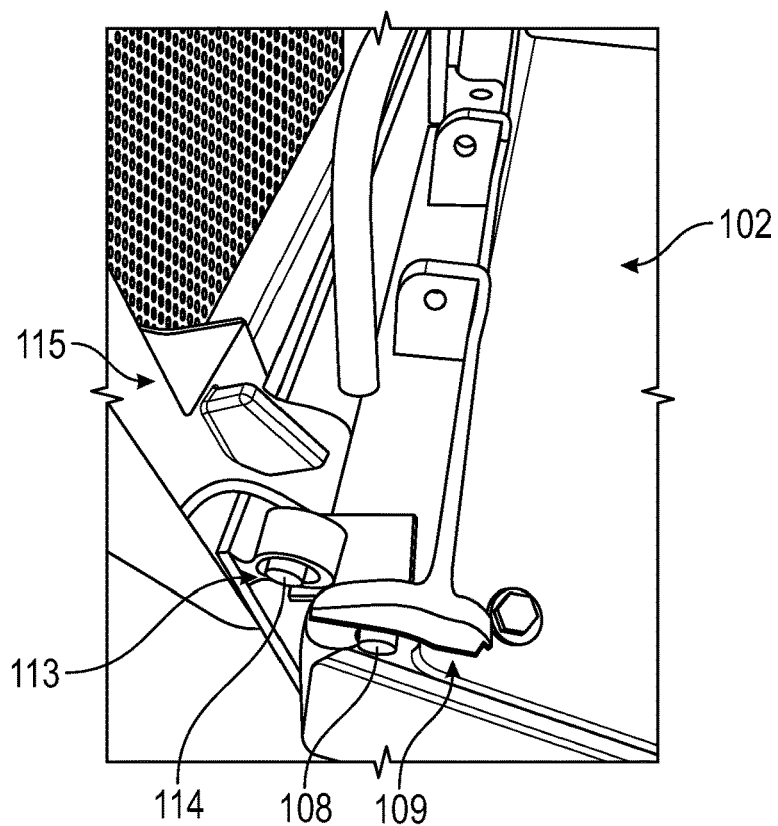
FIG. 4A is an enlarged, perspective view, of the mulch diverting apparatus of FIG. 1 coupled with the lawnmower and illustrating a first projection of the body portion coupled with a first orifice of the lawnmower and a third projection of the body portion coupled with a first projection of a grass collecting bin.
Figure 4B:
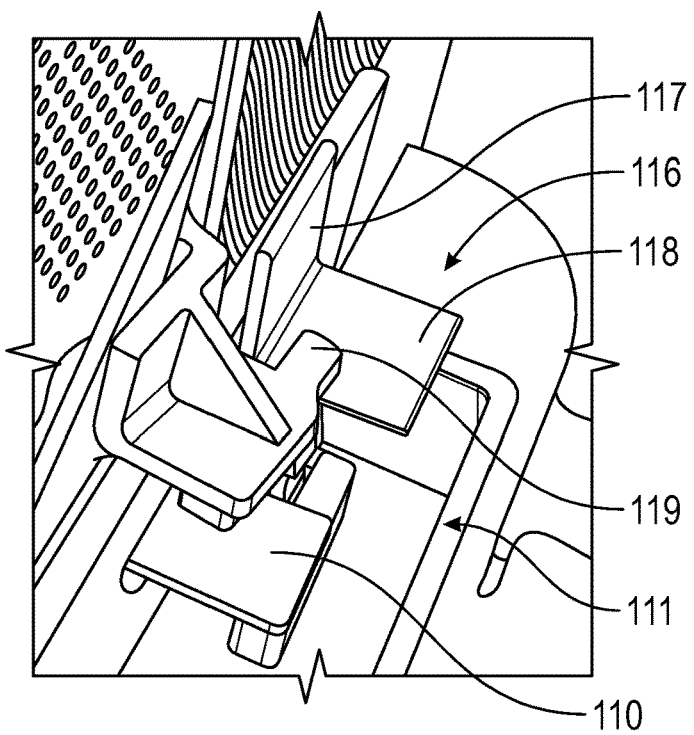
FIG. 4B is an enlarged, perspective view of the mulch diverting apparatus of FIG. 1 coupled with the lawnmower and illustrating a second projection of the body portion coupled with a channel of the lawnmower and a fourth projection of the body portion supporting a second projection of the grass collecting bin.

Referring particularly to FIGS. 1A and 1B, the lateral surface 107 of the body portion 103 of the panel 101 is a flat surface configured to face the lawnmower 102. However, the particular shape of the panel 101 may vary depending on the shape of the lawnmower 102 to which it is attached.

A handle 120 may extend from the body portion 103. The handle 120 assists in lifting the panel 101 for attachment to or removal from lawnmower 102. The handle 120 extends from the upper side 106 of the body portion 103.

In use, cut grass or grass clippings generated by the use of lawnmower 102 that would generally be diverted into grass collecting bin 115 through grass outlet 130 as mulched grass (i.e., grass clippings that have been cut by the lawnmower 102) is instead diverted in a downward direction with respect to the lawnmower 102 onto the ground. Thus, the cut grass is diverted away from the grass collecting bin and the cut grass is utilized as mulch for the same lawn or grass area that has just been cut by the lawnmower 102. This has the benefit of saving the lawnmower 102 operator the cost of disposing of cut grass, and provides the benefit of fertilizing the soil. For example, utilizing grass clipping in this manner as mulch can increase the nitrate content of the underlying soil to an optimum range. Alternatively, the inventor has unexpectedly discovered that when all grass clippings are routinely removed, the nitrate content in soil will tend to drop over time to below optimum levels. Therefore, in addition to saving operating costs, utilizing cut grass as much has the desirably effect of improving the health and appearance of a lawn by increasing the health of the underlying soil.

Figure 5:
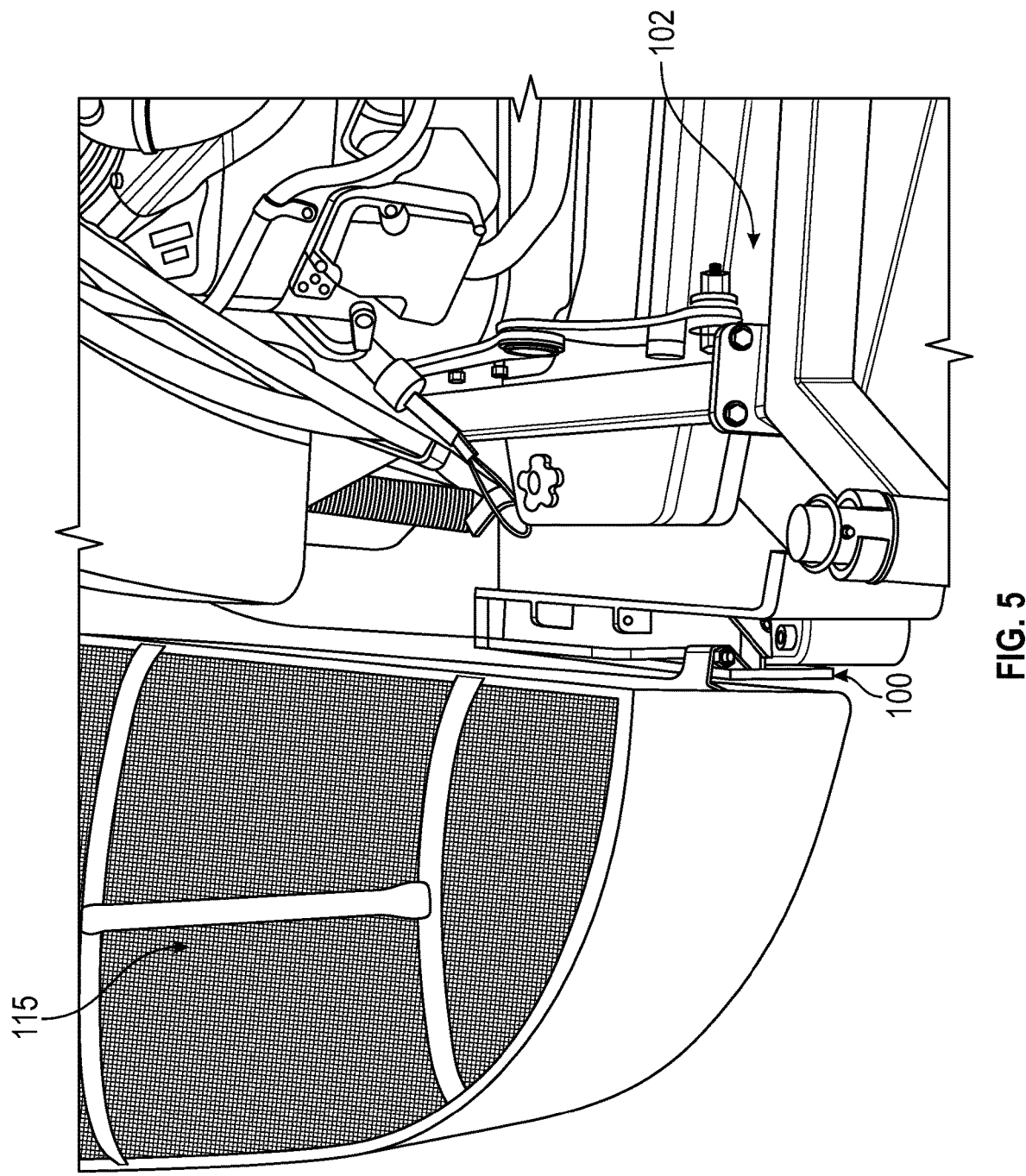
FIG. 5 is a perspective view of the mulch diverting apparatus coupled with the lawnmower and the grass collecting bin coupled with the mulch diverting apparatus.

Referring, for example, the FIG. 5, the mulch diverting apparatus 100 can also support the grass collecting bin 115 in an approximately conventional position with respect to the lawnmower 102. That is, the mulch diverting apparatus 100 can be coupled (e.g., removably coupled) with the lawnmower 102 and the grass collecting bin 115 can be coupled with and supported by the mulch diverting apparatus 100, as described herein. This allows the grass collecting bin 115 to ultimately remain coupled with the lawnmower 102 so that the grass collecting bin 115 is available for use, as needed. That is, the mulch diverting apparatus 100 can be removed, and the grass collecting bin 115 coupled directly to the lawnmower to allow grass cuttings to pass through grass outlet 130 and into the grass collecting bin 115 when collecting grass in a conventional manner is desired.

Figure 6A:
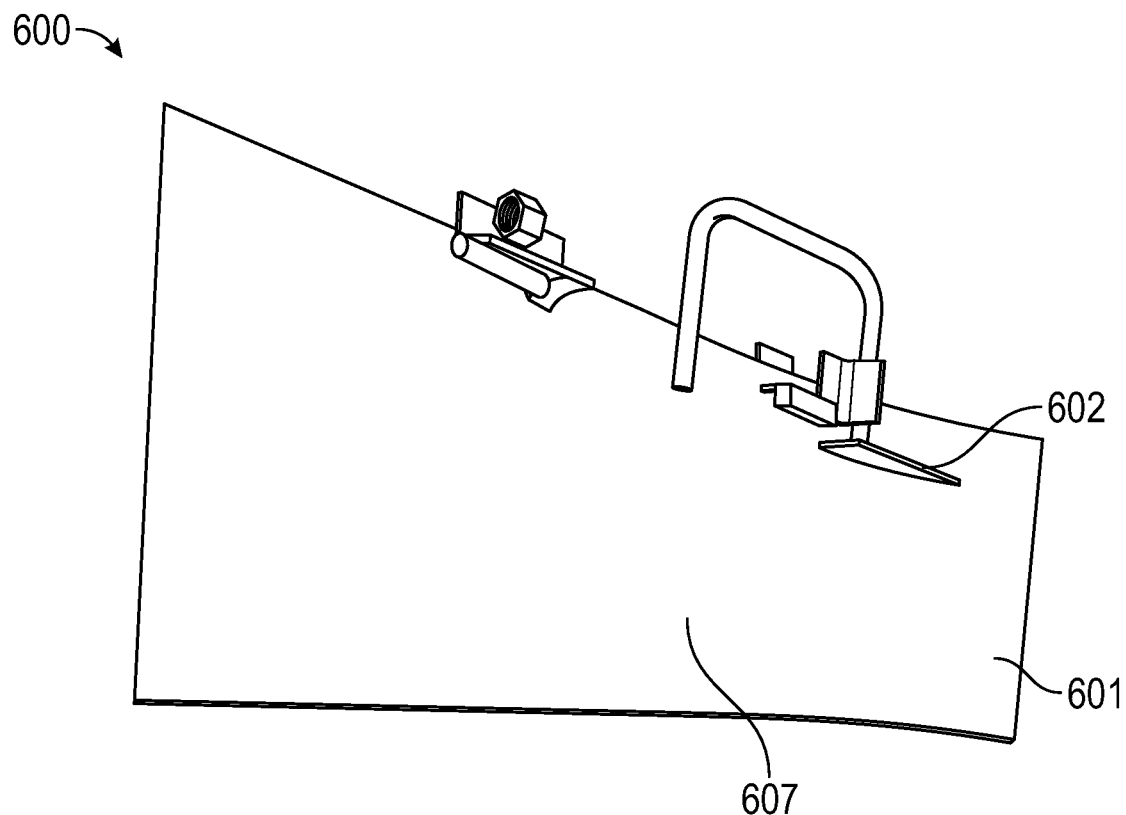
FIG. 6A is a side view of another mulch diverting apparatus according to aspects of the present disclosure.
Figure 6B:
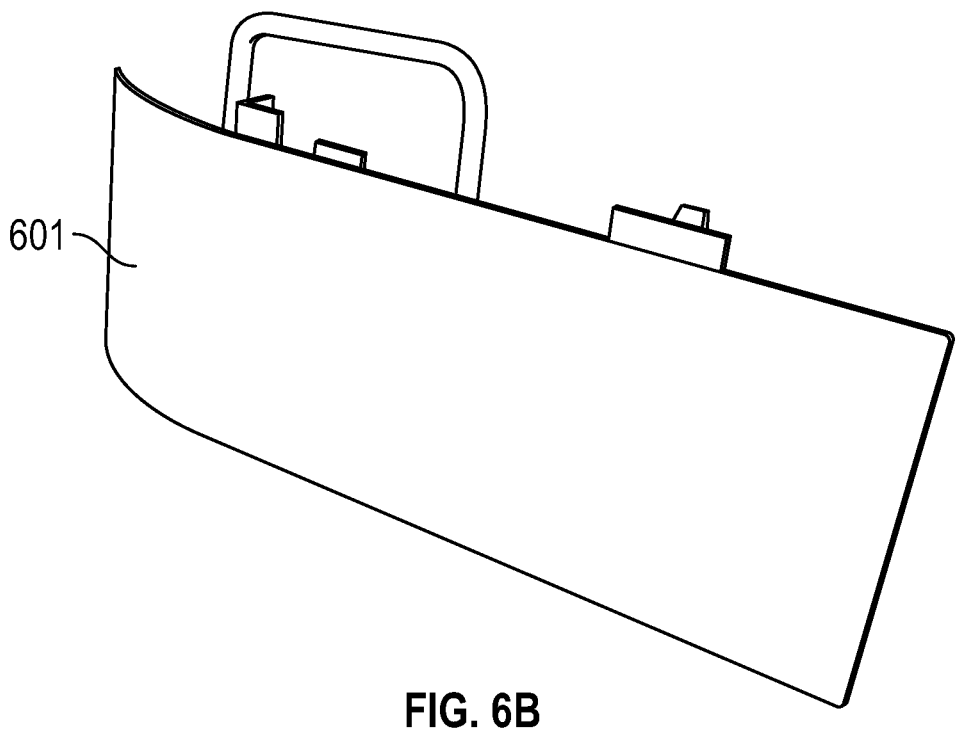
FIG. 6B is an opposite side view of the mulch diverting apparatus of FIG. 6A.

Referring particularly to FIGS. 6A and 6B, a mulch diverting apparatus 600 includes a curved lateral surface 601. The curved lateral surface 601 is configured to face a curved portion of the lawnmower.

A support projection 602 extending from lateral surface 607 can be utilized to provide lateral support to the curved lateral surface 601 of mulch diverting apparatus 600 to maintain a consistent spacing between the much diverting apparatus 600 and a lawnmower.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A mulch diverting apparatus, comprising:
a panel configured to be coupled with a lawnmower, the panel including a body portion defining a first side, a second side, an upper side, and a lateral surface configured to face the lawnmower, the body portion of the panel including:
a first projection extending from the lateral surface of the body portion of the panel, the first projection extending toward the first side of the panel, the first projection configured to mate with a first orifice formed in the lawnmower to couple the body portion of the panel with the lawnmower;
a second projection extending from the lateral surface of the body portion of the panel, the second projection extending toward the second side of the panel, the second projection configured to mate with a channel formed in the lawnmower to couple the body portion of the panel with the lawnmower;
a third projection extending from the lateral surface of the body portion of the panel, the third projection defining an orifice configured to receive a first projection of a grass collecting bin to couple the grass collecting bin with the lawnmower, the orifice facing along an axis substantially parallel to the lateral surface of the panel; and
a fourth projection extending from the lateral surface of the body portion of the panel, the fourth projection including a first arm configured to prevent lateral movement of the grass collecting bin with respect to the lawnmower.

2. The mulch diverting apparatus of claim 1, wherein the panel is configured to be removably coupled with the lawnmower.

3. The mulch diverting apparatus of claim 1, wherein the lawnmower is a commercial lawnmower.

4. The mulch diverting apparatus of claim 1, wherein the third projection and the fourth projection are configured to removably couple the grass collecting bin with the lawnmower.

5. The mulch diverting apparatus of claim 4, wherein the lawnmower is a commercial lawnmower.

6. The mulch diverting apparatus of claim 1, wherein the first projection of the body portion of the panel defines a substantially cylindrical shape.

7. The mulch diverting apparatus of claim 6, wherein the second projection of the body portion of the panel defining a substantially cuboidal shape.

8. The mulch diverting apparatus of claim 7, wherein the orifice defined by the third projection defines a substantially circular cross-sectional profile, and wherein the first projection of the grass collecting bin defines a substantially cylindrical shape.

9. The mulch diverting apparatus of claim 1, wherein the first arm of the fourth projection extends above the upper side of the body portion of the panel.

10. The mulch diverting apparatus of claim 9, wherein the fourth projection further includes a second arm extending from the lateral surface of the body portion of the panel at an angle with respect to the first arm, the second arm configured to support a second projection of the grass collecting bin to prevent downward movement of the grass collecting bin with respect to the lawnmower.

11. The mulch diverting apparatus of claim 1, wherein the lateral surface of the body portion of the panel is a substantially flat surface configured to face the lawnmower.

12. The mulch diverting apparatus of claim 1, wherein the lateral surface of the body portion of the panel includes a curved lateral surface, the curved lateral surface configured to face a curved portion of the lawnmower.

13. The mulch diverting apparatus of claim 1, further including a handle extending from the body portion of the panel.

14. The mulch diverting apparatus of claim 13, wherein the handle extends from the upper side of the body portion of the panel.

15. A mulch diverting apparatus, comprising:
a panel configured to be coupled with a lawnmower, the panel including a body portion defining a first side, a second side, an upper side, and a lateral surface configured to face the lawnmower, the body portion of the panel including:
a first projection extending from the lateral surface of the body portion of the panel, the first projection extending toward the first side of the panel;
a second projection extending from the lateral surface of the body portion of the panel, the second projection extending toward the second side of the panel;
a third projection extending from the lateral surface of the body portion of the panel, the third projection defining an orifice defined therein, the orifice configured to receive a projection of a grass collecting bin to couple the grass collecting bin with the lawnmower, the orifice facing along an axis substantially parallel to the lateral surface of the panel; and
a fourth projection extending from the lateral surface of the body portion of the panel, the fourth projection including a first arm.

16. The mulch diverting apparatus of claim 15, wherein the first projection of the body portion of the panel defines a substantially cylindrical shape.

17. The mulch diverting apparatus of claim 16, wherein the second projection of the body portion of the panel defining a substantially cuboidal shape.

18. The mulch diverting apparatus of claim 17, wherein the orifice defined by the third projection defines a substantially circular cross-sectional profile.

19. The mulch diverting apparatus of claim 15, wherein the first arm of the fourth projection extends above the upper side of the body portion of the panel.

20. The mulch diverting apparatus of claim 19, wherein the fourth projection further includes a second arm extending from the lateral surface of the body portion of the panel at an angle with respect to the first arm of the fourth projection.

\* \* \* \* \*